Feb. 10, 1970 E. L. MORAGNE 3,494,108
AIR CLEANER

Filed March 14, 1968 3 Sheets-Sheet 1

INVENTOR
EDWARD L. MORAGNE
BY Carlos A. Torres
ATTORNEY

United States Patent Office 3,494,108
Patented Feb. 10, 1970

3,494,108
AIR CLEANER
Edward L. Moragne, 4723 Nenana,
Houston, Tex. 77035
Filed Mar. 14, 1968, Ser. No. 713,205
Int. Cl. B01b 41/00
U.S. Cl. 55—227                                    10 Claims

ABSTRACT OF THE DISCLOSURE

A cleaning solvent spray apparatus to remove accumulated impurities from air filtration material disposed in a vent hood structure, including baffles in the hood to direct vapors through the filtration material and confine the cleaning solvent as it passes downwardly through the hood and conveyor means to drain solvent and removed impurities from the hood to a settling container where the cleaning solvent is separated from the impurities and is automatically returned to the hood and recirculated over the filtration material.

BACKGROUND OF THE INVENTION

Field of the invention

Most commercial and residential kitchens are equipped with facilities for exhausting vapors eminating from cooking foods. When meat and other foods have a high grease content are cooked, the vapors which are produced contain large amounts of grease and oil. As they cool, the grease and oil tend to condense from the vapors and accumulate in the exhaust systems where they present a significant fire hazard.

The present invention relates generally to the field of air filtering and cleansing. In particular, the present invention relates to safety means for automatically preventing the accumulation of grease and other impurities in systems used to exhaust vapors eminating from cooking foods.

Description of the prior art

To the extent that they are known to the applicant, all of the prior art devices and systems which have been used to prevent the accumulation of impurities in vapor exhaust systems are relatively complex and expensive. Many of these systems employ a refrigerating means for cooling the vapors to effect a condensation of grease and other airborne impurities on various cooled surfaces. Often, the condensed impurities are thereafter removed from the cooled surface by heating the surface to melt the impurities or by spinning the surface to remove the impurities under the influence of centrifugal force.

One prior art system filters the grease laden vapors through a pad of porous filter material. After a pre-determined exposure time, the filter pad is automatically removed and immersed in a washing solution to remove the accumulated grease. The removed filter is replaced by a filter which has been washed in the washing solution and the cycle is repeated continually. The means required to automatically effect the exchange of filters in this prior art system is both complex and expensive.

Another prior art system, such as that disclosed in U.S. Patent No. 2,601,519, draws grease laden vapors through the blades of a centrifugal fan. The fan blades are cooled and cleansed by a spray of washing solution and the impurities in the vapors condense as they strike the cooled fan blades. The centrifugal force created by the spinning of the fan blades cooperates with the cleansing solution to throw the condensed impurities against a surrounding filter pad. The washing solution is sprayed over the filter pad to break down the impurities and the run-off from the filter pad is accumulated in a reservoir where it is thereafter recirculated through the system by a pump. The foregoing system does not provide for automatic separation of the cleansing solution from the grease and as a consequence, the recirculation of the fluid in the reservoir may actually tend to coat the filters with grease. The accumulation of grease on the filter impairs its effectiveness and represents a potential fire hazard if the cleaning solution is not continually sprayed over the filter. Moreover, since unfiltered vapors strike the fan, the fan blades may accumulate unbalanced deposits of grease which cannot be removed by the combined action of the centrifugal force and the washing spray. Without periodic manual cleaning, the resulting build-up of grease at one part of the fan may create an unbalanced condition which would produce destructive oscillations and noise.

The prior art system taught by U.S. Patent No. 3,260,189 employs a filter wetting technique in combination with both a refrigeration means and an electrostatic filter to cleanse recycled air. One major problem area associated with the system taught by this patent is that a dry prefilter is employed in the first filtering step. The prefilter must be manually replaced at relatively short time intervals or the accumulation of grease and oil creates a fire hazard. The same danger exists in any of the prior art systems which employ an initial dry filter.

The foregoing problems as well as others in the prior art systems have tended to require high maintenance costs, and have reduced the reliability of the systems as an effective safety measure.

SUMMARY OF THE INVENTION

In the air cleaner of the present invention, grease and oil laden vapors are drawn through filter material contained in a simple hood structure. An inexpensive cleansing solvent is constantly sprayed over the filter material to break down the grease and oil accumulated on the filter material and carry it away to a settling tank. The lighter grease and oil separate from the washing solution and rise to the top of the settling tank and when the grease and oil reach a pre-determined level, they are automatically drained out of the tank. In restaurant installations, the grease which separates from the cleaning solvent may be sold commercially if desired to thereby convert what had been a serious fire hazard into a revenue producing product. The clean washing solution at the lower level of the tank is pumped back into the hood structure where it is sprayed over the filter material to complete the cycle. The washing solution is maintained at a relatively constant level in the tank by automatically adding new solution as it is required.

All of the filter material is constantly cooled and wetted by the circulating washing solution including the filter surface which is initially exposed to the hot vapors. This prevents any localized accumulations of grease and oil and obviates the need for periodic replacement of a dry prefilter. Moreover, the vapors do not strike the fan blades used to move the vapors until they have been cleansed by the filtering process. As a result, the fan blades do not accumulate deposits of impurities as is the case with the prior art systems which position the fan before the filtering step.

The system of the present invention is inexpensive to construct and install and its simplicity increases its dependability and effectiveness as a safety device.

DESCRIPTION OF THE PREFERRED EMBODIMENT

Figure 1:
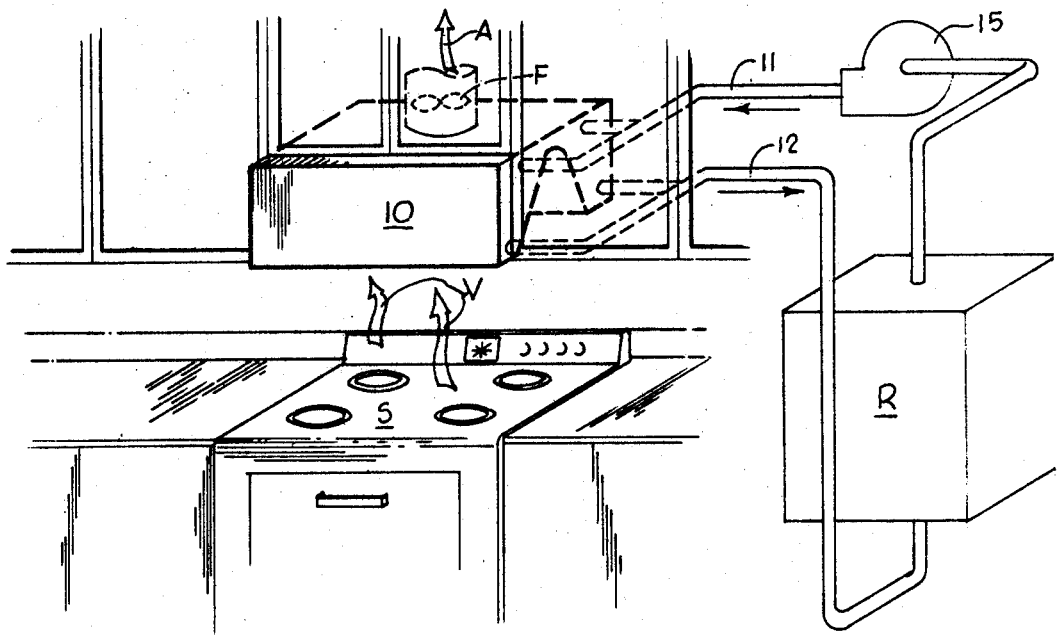
FIG. 1 is a schematic representation of the system employed by the air cleaner of the present invention.

With reference to FIG. 1 of the drawings, the grease hood portion of the present invention is indicated generally at 10. The hood 10 is mounted over any source of vapors such as a cooking stove S to collect the rising vapors V eminating from cooking foods. The grease and oil laden vapors V are drawn through the hood 10 by the action of a fan indicated schematically at F. The cleansed vapors are exhausted as grease and oil free air A into the outside atmosphere.

Figure 2:
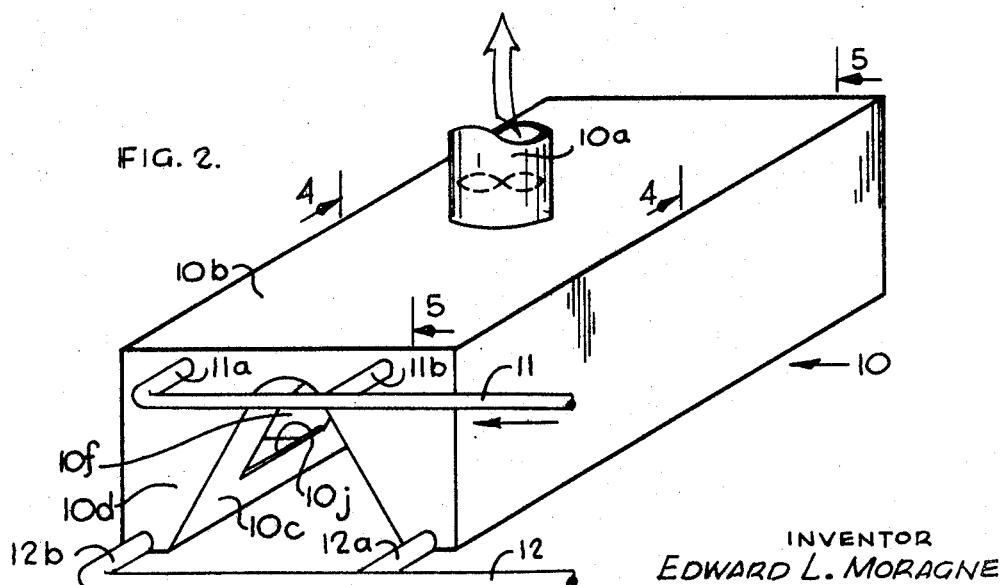
FIG. 2 is a perspective view of the grease hood portion of the air cleaner of the present invention.

The operation and construction of the hood 10 of the present invention may be best described by reference to FIGS. 2–5 of the drawings. With reference specifically to FIG. 2 of the drawings it may be seen that the hood 10 is generally rectangular in shape with an exhaust pipe 10a extending upwardly from the top wall 10b of the hood 10. The hood 10 may be constructed of galvanized sheet metal or any suitable material which will withstand high temperature and resist corrosion. An inverted, generally V-shaped wall 10c extends along the length of the hood 10 to form the lower surface of the hood. The wall 10c is disposed above the source of grease laden vapors V to assist in collecting and directing the vapors into the filtering means contained within the hood 10.

Two inlet supply conduits 11a and 11b extend through a side wall 10d to supply a cleaning solvent to the filter material contained within the hood 10. The cleaning solvent flows through and cleanses the filter material and washes the grease and oil and other impurities on the material to the bottom of the hood 10. The grease and oil which form the largest portion of the impurities are suspended in the cleaning solvent and are drained from the bottom of the hood 10 by two return conduits 12a and 12b which extend through the lower portion of the wall 10d.

Figure 3:
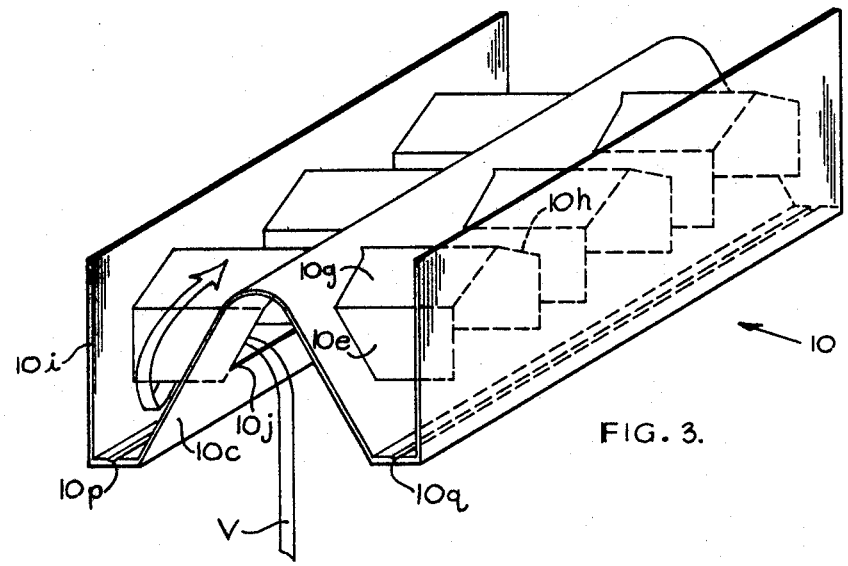
FIG. 3 is a perspective view view of a portion of the grease hood of the present invention with the outer cover and filter material removed for clarity of illustration.
Figure 5:
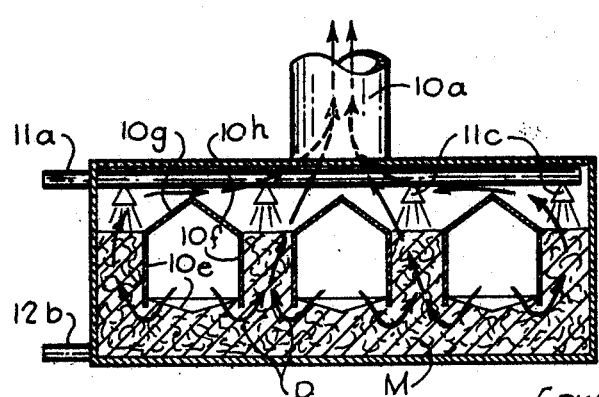
FIG. 5 is a cross section of the grease hood of the present invention taken along the line 5—5 of FIG. 2.

Referring to FIG. 3 of the drawings, the hood 10 is illustrated with the top wall 10b and the side wall 10d removed to illustrate details in the construction of the hood 10. In the illustrated form of the invention, six inlet baffles are employed with each baffle having two vertical walls 10e and 10f and two pitched walls 10g and 10h. As best illustrated in FIG. 5 of the drawings, the pitched walls 10g and 10h meet in an airtight seam to form a roof-like covering which is secured along its outer edges in airtight seams to the vertical walls 10e and 10f. The walls 10e, 10f, 10g, and 10h extend from the interior of the V-shaped surface 10c, to the inside surface of a side wall 10i of the hood 10. The baffle structure is secured within the hood 10 by any suitable means which will provide air-tight seams along the lines of contact with the walls 10c and 10i of the hood 10.

The grease laden vapors V are drawn into the baffles of the hood 10 under the influence of the fan F through openings 10j cut through the V-shaped wall 10c. The shape and air-tight mounting of the baffles within the hood 10 force the vapors V to flow under the vertical walls 10e and 10f as they flow toward the fan F.

Figure 4:
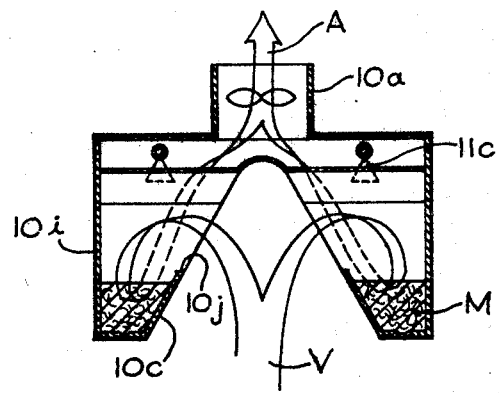
FIG. 4 is a cross section of the grease hood of the present invention taken along the line 4—4 of FIG. 2.

In the illustrated form of the grease hood 10 of the present invention, the hood 10 is packed with a suitable filter material M as illustrated in FIGS. 4 and 5 of the drawings. The material M may consist of any suitable material which will filter the grease and oil from the vapors V and which will also withstand high temperatures and constant washing by the cleaning solvent. The preferred filter material consists of a great number of Raschig rings or Raschig balls disposed in the hood 10. The Raschig ring is a ceramic sleeve having an outer diameter of ½". The Raschig balls are spheres having a ½" diameter. With reference to FIG. 5 of the drawing, the filter material M preferably rises to the top of the baffle walls 10e and 10f to provide maximum contact with the vapors being drawn up into the exhaust pipe 10a. The flow of the vapors through the material M is indicated by the arrows P.

The inlet conduit 11a supplies cleaning solvent to the spray nozzles 11c. The solvent is sprayed from the nozzles 11c onto the filter material M to cool the material and to remove the grease and oil collected by the material M as it filters the vapors V. Similar nozzles (not illustrated) extend from the supply line 11b to spray the material M in the other half of the hood 10. The cleaning solvent flows downwardly under the force of gravity and cleans the material M by removing the grease and oil accumulated by the material M as it filters the vapors V. The sloped, roof-like walls 10g and 10h of the baffles prevent the cleaning solvent from dropping out the hood 10. As best illustrated in FIG. 5 of the drawings, the filter material M is provided with a depressed surface below the baffles to assist in conducting the cleaning solvent over the depression.

The angle formed in the depression corresponds to the angle of repose of the particular material employed for the filter material M. Accordingly, the angle will vary depending on the particular material employed.

Figure 6:
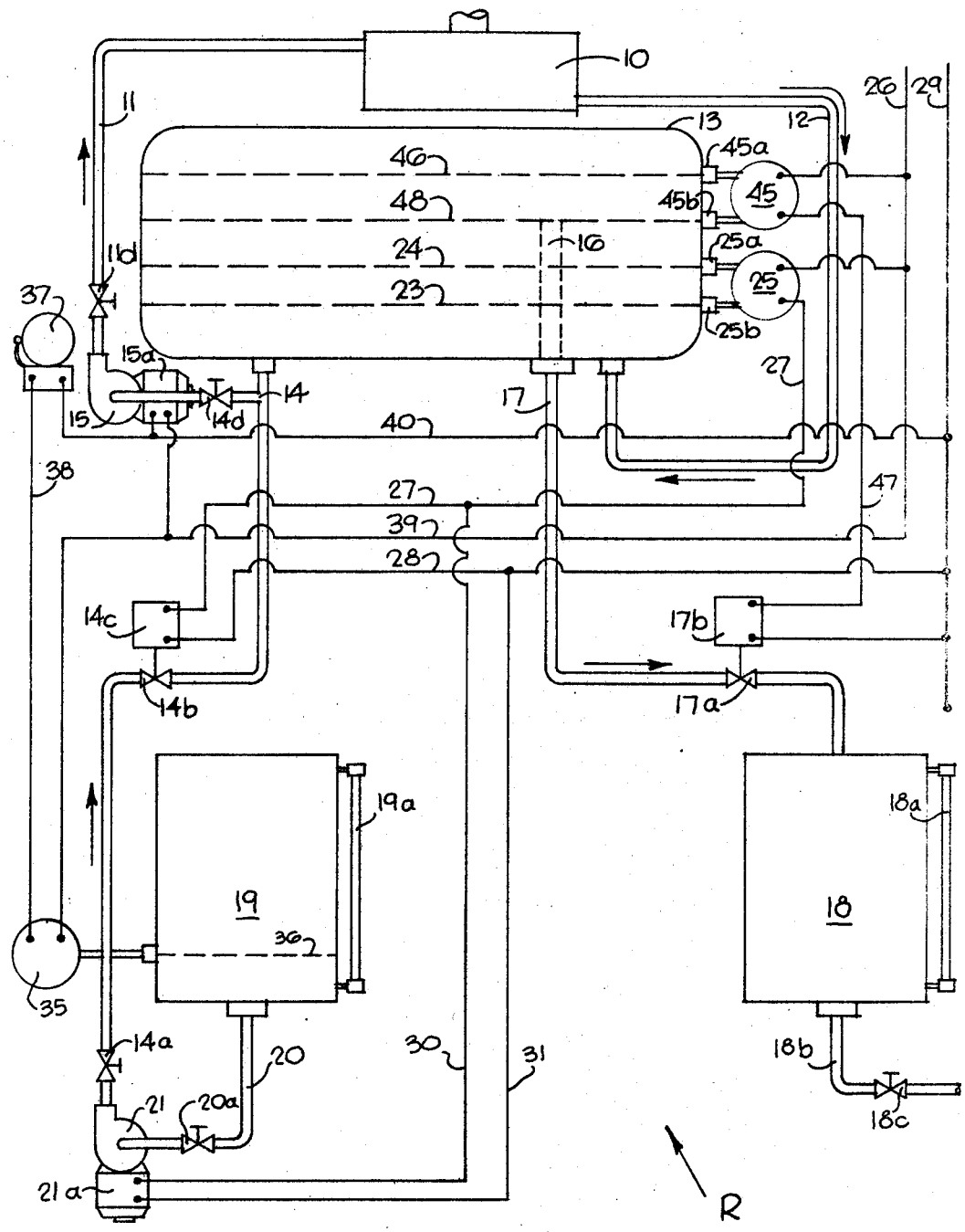
FIG. 6 is a schematic representation of the means used to purify and recirculate the cleansing solution employed in the air cleaner of the present invention.

With reference to FIG. 3 of the drawings, the solvent and the grease and oil removed from the material M collect in the small channels 10p and 10q formed along the interior surface of the bottom wall of the hood 10. The channels 10p and 10q return the dirty cleaning solvent to the return conduits 12a and 12b respectively. Referring jointly to FIGS. 1 and 6 of the drawings, the two lines 12a and 12b connect into the return line 12 which conducts the dirty cleaning solvent to an automatic recovery and circulation means indicated generally at R. The means R includes a settling tank 13 into which the dirty solvent drains from the line 12. The solvent separates from the impurities and settles to the bottom of the tank 13. The clean solvent is removed from the tank 13 through a line 14 which supplies the solvent to a pump indicated schematically at 15. The solvent is recirculated by the pump 15 which propels the solvent through a manually operable valve 11d and into the supply line 11. The supply line 11 is in turn connected to the two inlet conduits 11a and 11b as illustrated in FIG. 2 of the drawings.

The grease and oil are removed from the system by a skimmer pipe 16 which extends into the interior of the tank 13. The pipe 16 is open at its upper end while its lower end is connected to a line 17 which extends through an automatically actuated valve 17a to a grease and oil drainage tank 18. The tank 18 is equipped with a sight glass 18a and a drainage line 18b connected to a manually operable valve 18c.

Fresh cleaning solvent is automatically added to the system from a solvent storage tank 19 which is equipped with a sight glass 19a. The fresh solvent is conveyed to the tank 13 through a first line 20 which extends from the tank 19 through a manually operable valve 20a to pump 21. The pump 21 propels the cleaning solvent into the line 14 where it flows to the tank 13 through a first manually operable valve 14a and a second automatically operable valve 14b.

The cleaning solvent in the tank 13 is automatically maintained between two levels indicated by the dotted lines 23 and 24 by a level control 25. The control 25 is equipped with a high level detector 25a and a low level detector 25b. When the low level detector 25b detects the absence of cleaning solvent at the level 23 it closes a switch (not illustrated) in the control 25 to connect the electrical power supply to a solenoid 14c to automatically open the valve 14b. The electrical power is supplied to the solenoid 14c from an input line 26 through the closed switch (not illustrated) in the level control 25 and through an electrical line 27. An electrical line 28 extends from the solenoid 14c to a ground line 29 to complete the circuit.

An electrical line 30 is connected to the line 27 to supply power to an electrical motor indicated schematically at 21a. When the electrical switch (not illustrated) in the level control 25 closes, the motor 21a is energized to power the pump 21. The electrical circuit for the motor 21a is completed by a line 31 which is connected to ground through the line 28. When the pump is activated, cleaning solvent in the tank 19 is pumped through the open valve 14b and into the settling tank 13. The pumping continues until the high level detector 25a detects the presence of the cleaning solvent at the level 24. The high level detector 25a opens the electrical switch (not illustrated) in the level control 25 and de-energizes the electric motor 21a to stop the pump 21 and de-energizes the solenoid 14c to close the valve 14b.

The level control 25 may be any means which will automatically close an electrical circuit when the cleaning solvent in the tank 13 reaches one level and will automatically open the circuit when another level is reached. It is also necessary for the lever control 25a to be able to detect the difference between grease and oil and cleaning solvent. This may be accomplished by any suitable means such as a displacement float which will sink in the cleaning solvent but will float in the grease and oil.

Cleaning solvent must be added to the system of the present invention to replace that lost through evaporation, leakage or combination with the grease and oil. The level of the cleaning solvent in the solvent storage tank 19 is monitored by a level detector 35. When the level of the solvent in the tank 19 falls below the dotted line 36, the level detector 35 closes an electrical switch (not illustrated). The closing switch closes the circuit between electrical lines 38 and 39 to energize an alarm bell 37. The bell circuit is completed by a line 40 connected to the ground line 29.

The grease and oil in the tank 13 are automatically drained into the drainage tank 18 by the activation of a level control 45. The control 45 has a high lever detector 45a and a low lever detector 45b. When the detector 45a senses the presence of grease and oil at the level indicated by the dotted line 46, an electrical switch (not illustrated) in the control 45 closes. Closing of the switch electrically connects the power line 26 with a line 47 which powers a solenoid 17b and opens the valve 17a. The grease and oil in the tank 13 drain through the open top of the skimmer pipe 16 into the line 17 where it is then conveyed through the open valve 17a to the drainage tank 18.

When the grease and oil in the tank 13 reach the level indicated by the dotted line 48, the level detector 45b senses the absence of the grease and oil and opens the electrical switch (not illustrated) in the level control 45. The solenoid 17b is de-energized when the switch is opened and the vlave 17a is allowed to close and prevent further drainage from the tank 13.

The level control 45 may also be any means capable of closing an electrical switch when the grease and oil is at one level and opening the switch when it is at another level. There are many control devices presently available which have the various capabilities required of each of the level controls and no further elaboration on specific means is necessary for those having ordinary skill in the art.

The pump 15 is continuously operated by an electric motor 15a. The cleaning solvent in the tank 13 is continuously pumped from the line 14 through a manually operated valve 14d and through the pump 15 into the line 11. Power for the electric motor 15a is supplied from the line 39 with the circuit being completed by connection to ground through the line 40.

Many variations may be made in the system of the present invention. By way of example, rather than limitation, the electric motor 15a may be equipped with an automatic control which would vary the pumping rate of the cleaning solvent to correspond with the rate of entry of vapors into the hood 10 and the temperature of the hood. By way of further example, the alarm bell 37 may be wired to a level detector on the drainage tank 18 to provide a warning when the level of the grease and oil is approaching the top of the tank 18. In some installations it may be possible to omit the fresh solvent pump 21 and the motor 21a if the tank 19 can be placed above the tank 13 to permit a gravity feed. It would also be possible to apply the cleaning solvent to the filter material M by means other than spraying.

The cleaning solvent is preferably a solution of detergent and water or of caustic soda and water. However, any fireproof cleaning solvent which will remove the grease and oil from the filter material M and which will separate from these impurities in the settling tank 13 would be suitable.

I claim:
1. A cleaner for removing impurities from vapors comprising:
   (a) an enclosed hood structure including side walls, a top wall and a bottom wall;
   (b) filter material means disposed within said hood structure across said bottom wall for removing and accumulating impurities from vapors;
   (c) applicator means disposed within said hood structure positioned above said filter means for applying cleaning fluid to said filter material means to remove the impurities accumulated by said filter material means;
   (d) a plurality of inlet openings formed in said bottom wall for admitting vapors into said hood structure;
   (e) baffle means disposed internally of said hood structure for conducting the vapors through said filter material means from said openings in said bottom wall and for confining said cleaning fluid and filter material means within said hood structure;
   (f) said baffle means extending into said filter material means between said side walls and said bottom wall and being secured to said bottom wall adjacent the upper and side peripheries of each of said inlet openings;
   (g) portions of said filter material means being disposed against said bottom wall and baffle means internally of said hood structure whereby said vapors are conducted into said inlet openings, around said baffle means and directly through said filter material means;
   (h) an outlet means opening at said top wall for exhausting the cleansed vapors from said hood structure;
   (i) conveyor means connected to said hood structure adjacent said bottom wall for conveying cleaning fluid and impurities away from said filter material means;
   (j) separating means connected to said conveyor means for separating impurities from said cleaning fluid; and
   (k) supply means connecting said separating means and said hood structure and connected to said applicator means for automatically conveying impurity free cleaning fluid from said separating means to said applicator means.
2. The cleaner as defined in claim 1 wherein said hood structure further includes:
   (a) wall means included in said baffle means for deflecting the downward flow of cleaning fluid away from said inlet openings and for confining said filter material means away from said inlet openings with each of said wall means of said baffle means being secured to the internal surface of said bottom wall adjacent the upper and side peripheries of said inlet openings and extending to the internal surface of one of said side walls;

(b) portions of said filter material means being disposed against said wall means of each of said baffle means internally of said enclosed area whereby said vapors entering said inlet openings are deflected around said wall means of said baffle means and directly through said filter material means; and (c) said outlet means being included in said top wall for exhausting the cleansed vapors from said enclosed area.

3. The cleaner as defined in claim 2 wherein:
(a) said bottom wall is substantially in the form of an inverted V; and
(b) said applicator means is disposed between said top wall and said wall means of said baffle means.

4. The cleaner as defined in claim 2 wherein said filter material means includes a plurality of ceramic bodies disposed in said hood structure.

5. The cleaner as defined in claim 2 wherein:
(a) said applicator means includes nozzle means for spraying said cleaning fluid over said filter material means, and
(b) said supply means includes a fluid pump for pumping said cleaning fluid from said separating means and through said nozzle means.

6. The cleaner as defined in claim 5 wherein:
(a) said bottom wall is substantially in the form of an inverted V; and
(b) said applicator means is disposed between said top wall and said wall means of said baffle means.

7. The cleaner as defined in claim 2 wherein said separating means includes:
(a) a settling tank for receiving cleaning fluid and impurities from said conveyor means and for separating said cleaning fluid from the impurities;
(b) drain off means connected to said settling tank for automatically removing impurities separated from said cleaning fluid from said settling tank; and
(c) makeup means connected to said settling tank for automatically adding fresh cleaning fluid into said settling tank.

8. The cleaner as defined in claim 7 wherein said drain-off means includes:
(a) drainage conduit means connected to said settling tank;
(b) first valve means connected into said drainage conduit means for opening and closing said drainage conduit means; and
(c) first regulator means connected between said settling tank and said first valve means for automatically opening said first valve means when the top level of the contents of said settling tank reach a first pre-determined high level in said settling tank and for automatically closing said first valve means when the top level of the contents of the settling tank reach a second lower level in said settling tank.

9. The cleaner as defined in claim 8 wherein said makeup means further includes:
(a) a makeup tank for containing fresh cleaning fluid;
(b) supply conduit means connected between said makeup tank and said settling tank for conducting cleaning fluid from said makeup tank to said settling tank;
(c) a second valve means disposed in said conduit means for opening and closing said conduit means; and
(d) a second regulator means connected between said settling tank and said second valve means for automatically opening said second valve means when the upper level of the cleaning fluid in said settling tank reaches a third pre-determined low level in said settling tank and for automatically closing said second valve means when the upper level of said cleaning fluid reaches a fourth pre-determined high level in said settling tank.

10. The cleaner as defined in claim 9 wherein:
(a) said bottom wall is substantially in the form of an inverted V; and
(b) said applicator means is disposed between said top wall and said wall means of said baffle means.

References Cited

UNITED STATES PATENTS

| | | | |
|---|---|---|---|
| 458,538 | 8/1891 | Olsen | 55—234 |
| 928,665 | 7/1909 | Kelly | 55—227 |
| 977,605 | 12/1910 | Dow | 261—98 |
| 1,886,777 | 11/1932 | Anderson | 55—227 |
| 2,523,441 | 9/1950 | McKamy | 55—233 |
| 2,577,150 | 12/1951 | Pledger. | |
| 2,693,946 | 11/1954 | McIlvaine | 55—233 |
| 2,905,136 | 9/1959 | Jukes | 55—274 |
| 3,242,652 | 3/1966 | Malenchini. | |
| 3,260,189 | 7/1966 | Jensen. | |
| 3,317,192 | 5/1967 | Lohner et al. | 261—98 |
| 3,336,733 | 8/1967 | Wisting | 55—228 |
| 3,348,825 | 10/1967 | McIlvaine | 261—98 |
| 3,364,664 | 1/1968 | Doane. | |
| 3,393,497 | 7/1968 | Donnelly. | |

HARRY B. THORNTON, Primary Examiner

B. NOZICK, Assistant Examiner

U.S. Cl. X.R.

55—228, 233, 242, 260; 98—115; 261—98, 117